United States Patent
Jung et al.

(10) Patent No.: US 8,625,692 B2
(45) Date of Patent: Jan. 7, 2014

(54) TRANSMISSION/RECEPTION APPARATUS AND METHOD FOR IMPROVING THROUGHPUT IN A MULTI-INPUT MULTI-OUTPUT COMMUNICATION SYSTEM

(75) Inventors: Young-Seok Jung, Suwon-si (KR); Jong-Han Lim, Seoul (KR); Sung-Soo Kim, San Diego, CA (US)

(73) Assignee: Samsung Electronics Co., Ltd. (KR)

(*) Notice: Subject to any disclaimer, the term of this patent is extended or adjusted under 35 U.S.C. 154(b) by 497 days.

(21) Appl. No.: 12/892,358

(22) Filed: Sep. 28, 2010

(65) Prior Publication Data

US 2011/0075753 A1  Mar. 31, 2011

(30) Foreign Application Priority Data

Sep. 28, 2009 (KR) .................. 10-2009-0092047
Sep. 27, 2010 (KR) .................. 10-2010-0093476

(51) Int. Cl.
*H04L 1/02* (2006.01)
*H04B 1/00* (2006.01)

(52) U.S. Cl.
USPC ............................................ 375/267; 375/130

(58) Field of Classification Search
USPC .......... 375/267, 260, 130, 347, 349; 455/522; 714/394, 704, 748; 370/69, 335
See application file for complete search history.

(56) References Cited

U.S. PATENT DOCUMENTS

2008/0188259 A1* 8/2008 Blanz et al. ................... 455/522
2011/0185249 A1* 7/2011 Jongren et al. ................ 714/748

* cited by examiner

*Primary Examiner* — Khai Tran
(74) *Attorney, Agent, or Firm* — The Farrell Law Firm, P.C.

(57) ABSTRACT

A method and apparatus for transmitting at least two transport blocks in a Multi-Input Multi-Output (MIMO) communication system, in which a transmitter determines whether a type of a receiver receiving the at least two transport blocks is a Successive Interference Cancellation (SIC) receiver, determines a Modulation and Coding Scheme (MCS) level for the at least two transport blocks depending on whether the type of the receiver is an SIC receiver, and transmits the at least two transport blocks using the determined MCS level.

32 Claims, 10 Drawing Sheets

TRANSMISSION/RECEPTION APPARATUS AND METHOD FOR IMPROVING THROUGHPUT IN A MULTI-INPUT MULTI-OUTPUT COMMUNICATION SYSTEM

PRIORITY

This application claims priority under 35 U.S.C. §119(a) to Korean Patent Applications filed in the Korean Intellectual Property Office on Sep. 28, 2009 and Sep. 27, 2010, and assigned Serial Nos. 10-2009-0092047 and 10-2010-0093476, respectively, the entire disclosure of both of which are incorporated herein by reference.

BACKGROUND OF THE INVENTION

1. Field of the Invention

The present invention relates generally to a transmission/reception apparatus and method for improving throughput in a Multi-Input Multi-Output (MIMO) communication system.

2. Description of the Related Art

Next-generation communication systems have introduced MIMO to increase the capacity of wireless channels operated with limited frequency resources. The widely used Long Term Evolution (LTE) and Wireless Broadband (WiBro) standards are based on MIMO.

Additionally, the next-generation communication systems increase spectral efficiency or frequency efficiency by adaptively allocating a modulation order and an error-correcting code to channels between a transmitter and a receiver based on Adaptive Modulation and Coding (AMC). Meanwhile, to increase the system throughput by improving reception performance, the receiver takes advantage of Successive Interference Cancellation (SIC) that uses decoding results of one transport layer.

Figure 1:
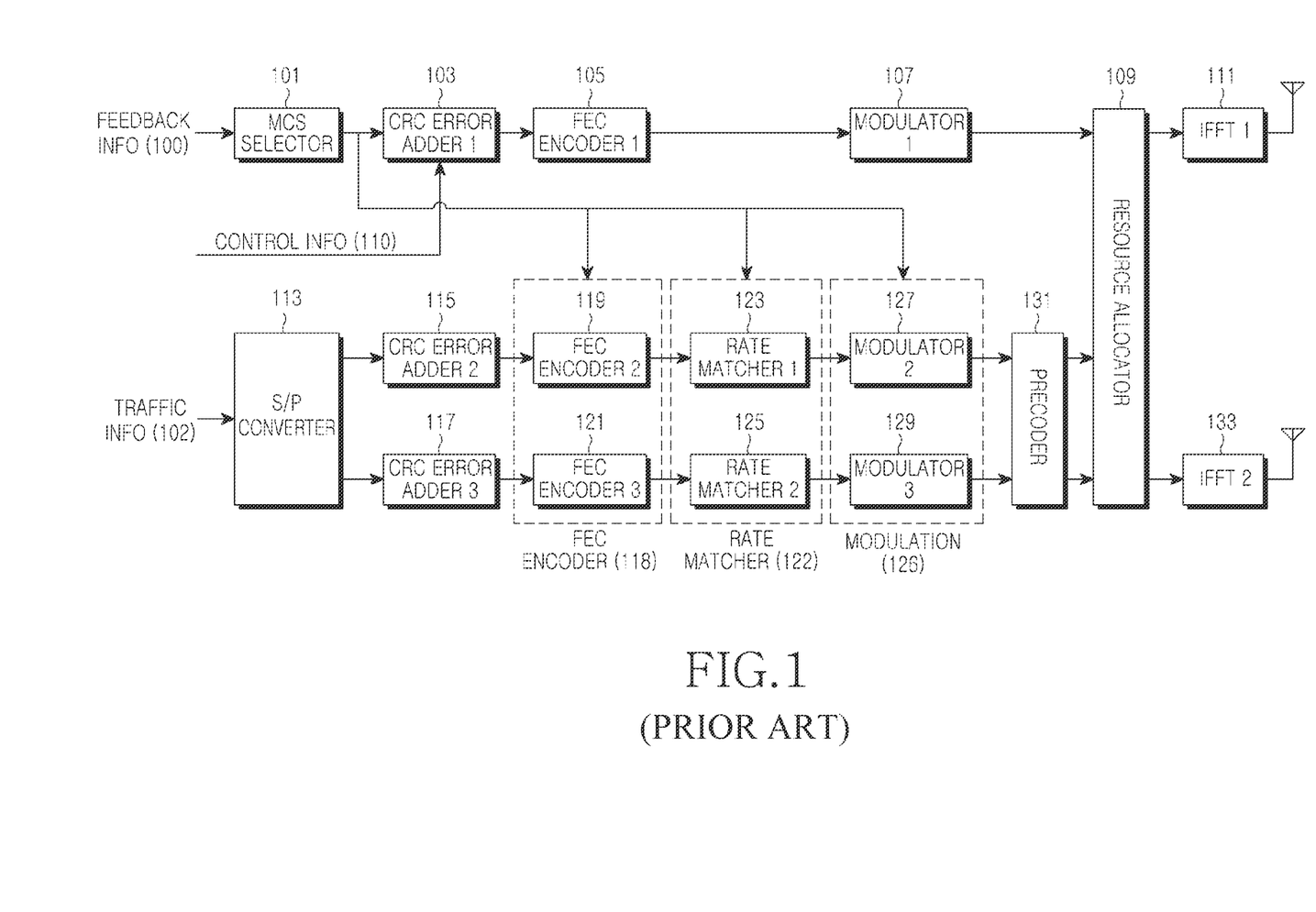
FIG. 1 is a diagram showing a transmitter structure for large-delay CDD precoding in a MIMO communication system.

FIG. 1 shows a transmitter structure for large-delay Cyclic Delay Diversity (CDD) precoding in a MIMO communication system. The large-delay CDD is reflected in or applied to open loop spatial multiplexing, and this technology decentralizes a transport layer to all virtual antennas, contributing to a reduction in the amount of Channel Quality Information (CQI) or feedback information and the robustness of its accurate feedback.

Referring to FIG. 1, the transmitter includes a Modulation and Coding Scheme (MCS) selector 101, a first Cyclic Redundancy Check (CRC) error adder 103, a first Forward Error Correction (FFC) encoder 105, a first modulator 107, a resource allocator 109, a first Inverse Fast Fourier Transform (IFFT) unit 111, a Serial-to-Parallel (S/P) converter 113, a second CRC error adder 115, a third CRC error adder 117, a second FEC encoder 119, a third FEC encoder 121, a first rate matcher 123, a second rate matcher 125, a second modulator 127, a third modulator 129, a precoder 131, and a second IFFT unit 133.

Upon receipt of CQI feedback information 100 of each user, the MCS selector 101 determines an MCS level for each user's transport block based on the received CQI feedback information 100, and then outputs the MCS level to the first CRC error adder 103, an FEC encoding block 118, a rate-matching block 122, and a modulation block 126. As used herein, the transport block represents an independent information block undergoing encoding. It is assumed in FIG. 1 that there are two transport blocks and the transport blocks are equivalent to a codeword.

The first CRC error adder 103 generates a control signal to be transmitted to a receiver by integrating the MCS level of each user's transport block and each user's control information 110, adds to the control signal a CRC code for detecting an error occurring in a transmission process, and outputs the CRC-added control signal to the first FEC encoder 105.

The first FEC encoder 105 receives a signal output from the first CRC error adder 103, performs thereon FEC encoding for correcting an error occurring due to noise, using an FEC code, and outputs the FEC-encoded signal to the first modulator 107. There is no limit on the type of the FEC code. Generally, convolutional codes or trellis codes may be used as an FEC code for CQI feedback information.

The first modulator 107 receives a signal output from the first FEC encoder 105, maps the received signal to a signal constellation point, and outputs the mapped signal to the resource allocator 109.

Meanwhile, upon receipt of each user's traffic information 102, the S/P converter 113 divides the received traffic information 102 into N pieces of traffic information, where N is the number (i.e., two) of each user's transport blocks, and outputs the divided two pieces of traffic information to the second and third CRC error adders 115 and 117, respectively. The second and third CRC error adders 115 and 117 add to their input signals a CRC code for detecting an error occurring in the transmission process, and output the CRC-added signals to the second and third FEC encoders 119 and 121, respectively. The second and third FEC encoders 119 and 121 receive signals output from the second and third CRC error adders 115 and 117, respectively, perform thereon FEC encoding for correcting errors due to noise, using an FEC code, and output the FEC-encoded signals to the first and second rate matchers 123 and 125, respectively. As stated above, there is no limit on the type of the FEC code. Generally, convolutional codes, turbo codes, or Low Density Parity Check (LDPC) codes may be used as an FEC code for traffic information.

The first and second rate matchers 123 and 125 receive signals output from the second and third FEC encoders 119 and 121, respectively, perform thereon rate matching so that the number of bits of the input signals may be matched to the number of modulation symbols allocated to each user, and output the rate-matched signals to the second and third modulators 127 and 129, respectively.

The second and third modulators 127 and 129 receive signals output from the first and second rate matchers 123 and 125, respectively, map the received signals to a signal constellation point, and output the mapped signals to the precoder 131.

The precoder 131 receives each of the signals output from the second and third modulators 127 and 129, generates a traffic channel signal by precoding the received signals according to a predetermined rule, for example, large-delay CDD, and outputs the traffic channel signal to the resource allocator 109. A modulation order used in the second and third modulators 127 and 129 is determined depending on the MCS level selected by the MCS selector 101, and the CRC error adders, the FEC encoders and the modulators used for the CQI feedback information 100 and the traffic information 102 are generally different from one another.

The resource allocator 109 reorders a traffic channel signal, a control channel signal and a pilot signal, adjusts power levels of respective channels according to the power ratio capable of guaranteeing reception performance of the channels, applies the adjusted power levels to the reordered signals, and outputs the power-adjusted signals to the first and second IFFT units 111 and 133. The first and second IFFT units 111 and 133 transform frequency-domain signals output from the resource allocator 109 into time-domain signals, and output the time-domain signals via their transmit antennas.

Figure 2:
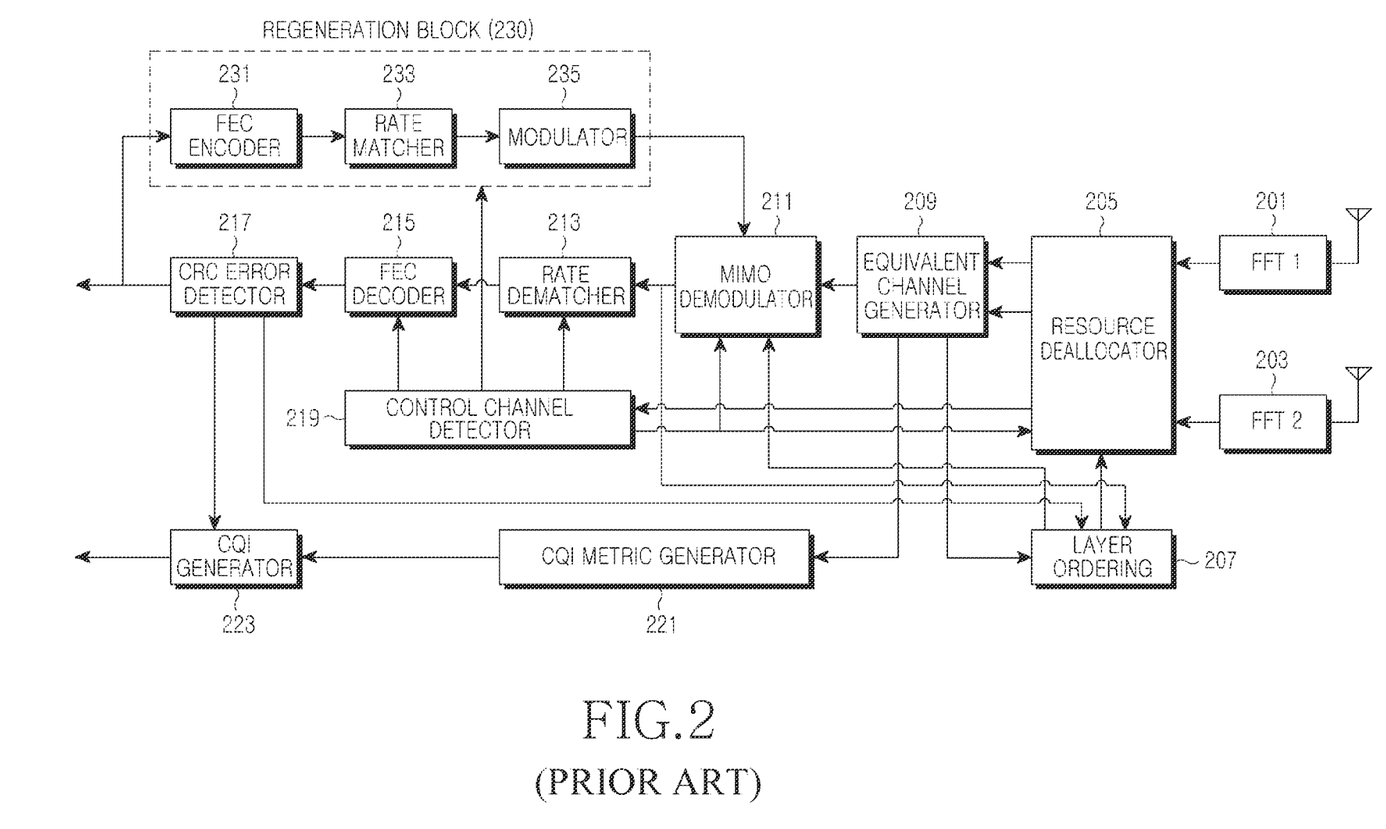
FIG. 2 is a diagram showing a structure of a receiver, which corresponds to the transmitter of FIG. 1 and to which SIC is applied, in a MIMO communication system.

FIG. 2 shows a structure of a receiver, which corresponds to the transmitter of FIG. 1 and to which SIC is applied (hereinafter referred to as an "SIC receiver"), in a MIMO communication system.

Referring to FIG. 2, the SIC receiver includes a first Fast Fourier Transform (FFT) unit 201, a second FFT unit 203, a resource deallocator 205, a layer ordering unit 207, an equivalent channel generator 209, a MIMO demodulator 211, a rate dematcher 213, an FEC decoder 215, a CRC error detector 217, a control channel detector 219, a CQI metric generator 221, a CQI generator 223, an FEC encoder 231, a rate matcher 233, and a modulator 235. The components other than the CQI metric generator 221 and the CQI generator 223 may be called a "signal receiver" since they are for signal reception.

The first and second FFT units 201 and 203 transform time-domain signals received via their receive antennas, into frequency-domain signals, and output the frequency-domain signals to the resource deallocator 205. The resource deallocator 205 separates signals output from the first and second FFT units 201 and 203 into a traffic channel signal and a control channel signal, and outputs the traffic channel signal to the MIMO demodulator 211 through the equivalent channel generator 209 and the control channel signal to the control channel detector 219.

The control channel detector 219 detects an MCS level for each user's transport block, resource allocation information of the traffic channel, the number of transport layers, necessity of retransmission, etc., which are needed for the reception of the traffic channel signal, using the control channel signal and channel estimate output from the resource deallocator 205, and delivers the detected information to the blocks requiring the information. In particular, the control channel detector 219 detects the MCS level for each user's transport block, and outputs the detected MCS level to the resource deallocator 205, the MIMO demodulator 211, the rate dematcher 213 and the FEC decoder 215.

The layer ordering unit 207 determines one of the two transport blocks carrying traffic channel signals, which is to be decoded first. Generally, the layer ordering unit 207 determines the channel status for each of transport blocks, using an equivalent channel value output from the equivalent channel generator 209, a Log Likelihood Ratio (LLR) value output from the MIMO demodulator 211, and error detection results output from the CRC error detector 217, and determines a decoding order so that transport blocks may be decoded in order of better channel status. The equivalent channel generator 209 reflects in the equivalent channel value the result caused by precoding the transmission signal by large-delay CDD in accordance with a predetermined rule, based on the number of transport layers, detected by the control channel detector 219, and the resource allocation information for the traffic channel.

For a transport block that is determined to be decoded first in the decoding order by the layer ordering unit 207, the MIMO demodulator 211 receives an equivalent channel value of the equivalent channel generator 209 and a received signal on the traffic channel, generates an LLR value using a MIMO receive algorithm, and outputs the generated LLR to the rate dematcher 213.

The rate dematcher 213 receives a signal output from the MIMO demodulator 211, and performs rate dematching on the received signal, and the FEC decoder 215 FEC-decodes the rate-dematched signal, and outputs the FEC-decoded signal to the CRC error detector 217. The CRC error detector 217 detects an error occurring in the transmission process from the signal decoded by the FEC decoder 215 using the CRC technique, and determines necessity of retransmission. If no error is detected, the CRC error detector 217 delivers the decoded signal to an upper layer. The MIMO receive algorithm may include a linear receive algorithm based on Minimum Mean Square Examination (MMSE) or QR decomposition, and an algorithm based on Maximum Likelihood (ML).

If no CRC error is detected in the first decoded transport block, an LLR value for a transport block that is determined to be decoded next, i.e., secondly, in the decoding order by the layer ordering unit 207, may be generated by a regeneration block 230. That is, if a transmission signal for the first decoded transport block is generated and delivered to the MIMO demodulator 211, then the MIMO demodulator 211 generates an LLR value for a second transport block by removing the transmission signal for the first decoded transport block from the received signal on the traffic channel, and outputs the generated LLR to the rate dematcher 213. The rate dematcher 213 receives a signal output from the MIMO demodulator 211 and performs rate dematching on the received signal, and the FEC decoder 215 FEC-decodes the rate-dematched signal and outputs the FEC-decoded signal to the CRC error detector 217. The CRC error detector 217 detects an error occurring in the transmission process from the signal decoded by the FEC decoder 215 using the CRC technique, and determines necessity of retransmission. If no error is detected, the CRC error detector 217 delivers the decoded signal to the upper layer.

It is assumed herein that no CRC error is detected in the first decoded transport block. In this way, if no CRC error is detected in the first decoded transport block, the transmission signal for the first decoded transport block is removed from the received signal on the traffic channel using the regeneration block 230, and this scheme is called "SIC scheme." If a CRC error is detected in the first decoded transport block, an LLR value of a second decoded transport block is also generated in the same method as the first decoded transport block.

The CQI metric generator 221 generally estimates a CQI metric value such as an effective Signal to Interference plus Noise Ratio (SINR) using the equivalent channel value output from the equivalent channel generator 209, and outputs the estimated CQI metric value to the CQI generator 223. While it is assumed herein that the CQI metric value is generated using the equivalent channel value, the CQI metric value may be generated using the LLR value output from the MIMO demodulator 211.

The CQI generator 223 receives the CQI metric value output from the CQI metric generator 221, quantizes the CQI metric value, and generates a CQI index to be reported to a transmitter. In generating the CQI index, the CQI generator 223 may use ACKnowledgement (ACK)/Negative ACKnowledgement (NACK) information received from the CRC error detector 217. The generated CQI index is fed back to the transmitter along with feedback information.

Meanwhile, if signals output from the second and third modulators 127 and 129 in FIG. 1 are defined as $[x_1, x_2]^T$, traffic channel signals $[y_1, y_2]^T$ being output through the precoder 131 can be represented by Equation (1) as follows:

$$\begin{pmatrix} y_1 \\ y_2 \end{pmatrix} = \begin{pmatrix} 1 & 0 \\ 0 & e^{-\pi i} \end{pmatrix} \frac{1}{\sqrt{2}} \begin{pmatrix} 1 & 1 \\ 1 & -1 \end{pmatrix} \begin{pmatrix} x_1 \\ x_2 \end{pmatrix} \quad (1)$$

where i represents indices 0, 1 and 2 of Resource Elements (REs) through which traffic channel signals are transmitted.

Additionally, equivalent channels that $x_1$ and $x_2$ actually undergo in the receiver of FIG. 2, can be defined as follows in Equation (2):

$$\begin{pmatrix} h_{e,11} & h_{e,21} \\ h_{e,12} & h_{e,22} \end{pmatrix} = \begin{pmatrix} h_{11} & h_{21} \\ h_{12} & h_{22} \end{pmatrix} \begin{pmatrix} 1 & 0 \\ 0 & e^{-\pi i} \end{pmatrix} \frac{1}{\sqrt{2}} \begin{pmatrix} 1 & 1 \\ 1 & -1 \end{pmatrix} \quad (2)$$

$$= \frac{1}{\sqrt{2}} \begin{pmatrix} h_{11} + h_{21}(-1)^i & h_{11} - h_{21}(-1)^i \\ h_{12} + h_{22}(-1)^i & h_{12} - h_{22}(-1)^i \end{pmatrix}$$

As can be understood from Equation (2), assuming that adjacent REs are the same in actual channel characteristic, since $x_1$ and $x_2$ undergo equivalent channel characteristics, the CQI feedback information being transmitted to the transmitter to which large-delay CDD is applied, carries only one value rather than carrying a separate value for each transport block. Therefore, in determining an MCS level for each transport block, the transmitter also determines the same MCS level for different transport blocks.

However, if every transport block has the same MCS level in the transmitter to which large-delay CDD is applied, the SIC receiver may disadvantageously fail to achieve its potential capabilities to improve throughput.

SUMMARY OF THE INVENTION

An aspect of the present invention is to address at least the above-mentioned problems and/or disadvantages and to provide at least the advantages described below. Accordingly, an aspect of the embodiments of the present invention is to provide a transmission/reception apparatus for improving throughput in a MIMO communication system, and a method for supporting the same.

Another aspect of the embodiments of the present invention is to provide a transmission apparatus for selecting an MCS level so as to improve throughput in a MIMO communication system, and a method for supporting the same.

Another aspect of the embodiments of the present invention is to provide a reception apparatus for generating CQI information so as to improve throughput in a MIMO communication system, and a method for supporting the same.

In accordance with one aspect of the present invention, there is provided a method for transmitting at least two transport blocks in a Multi-Input Multi-Output (MIMO) communication system. The method includes determining by a transmitter whether a type of a receiver receiving the at least two transport blocks is a Successive Interference Cancellation (SIC) receiver; determining a Modulation and Coding Scheme (MCS) level for the at least two transport blocks depending on whether the type of the receiver is an SIC receiver; and transmitting the at least two transport blocks using the determined MCS level.

In accordance with another aspect of the present invention, there is provided an apparatus for transmitting at least two transport blocks in a Multi-Input Multi-Output (MIMO) communication system. The apparatus includes a first means for determining whether a type of a receiver receiving the at least two transport blocks is a Successive Interference Cancellation (SIC) receiver; an Modulation and Coding Scheme (MCS) selector for determining a MCS level for the at least two transport blocks depending on whether the type of the receiver is an SIC receiver; and a signal generator for transmitting the at least two transport blocks using the determined MCS level.

In accordance with another aspect of the present invention, there is provided a method for receiving at least two transport blocks from a transmitter by a receiver in a Multi-Input Multi-Output (MIMO) communication system. The method includes transmitting, to the transmitter, type information indicating whether the receiver is a Successive Interference Cancellation (SIC) receiver; receiving response information indicating receipt of the receiver type information, from the transmitter using an upper-layer message; transmitting Channel Quality Information (CQI) to the transmitter in reply to the response information; and receiving the at least two transport blocks to which a Modulation and Coding Scheme (MCS) determined using the CQI is applied.

In accordance with another aspect of the present invention, there is provided a receiver for receiving at least two transport blocks from a transmitter in a Multi-Input Multi-Output (MIMO) communication system. The receiver includes a type generator for generating type information indicating whether the receiver is a Successive Interference Cancellation (SIC) receiver, and transmitting the type information to the transmitter; a Channel Quality Information (CQI) generator for receiving response information indicating receipt of the receiver type information from the transmitter using an upper-layer message, generating CQI in reply to the response information, and transmitting the CQI to the transmitter; and a signal receiver for receiving the at least two transport blocks to which a Modulation and Coding Scheme (MCS) determined using the CQI is applied.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE EMBODIMENTS OF THE PRESENT INVENTION

Embodiments of the present invention will now be described in detail with reference to the accompanying drawings. Descriptions of well-known functions and constructions are omitted for clarity and conciseness.

In this specification, detailed descriptions will be made of an example of a transmission/reception apparatus and method for improving throughput in a MIMO communication system.

Additionally, detailed description will be made of examples of a method for selecting an MCS level by a transmission apparatus to improve throughput in a MIMO communication system, and a method for generating a CQI to be fed back to the transmission apparatus by a reception apparatus.

In detailed descriptions of embodiments of the present invention, the examples of the transmission/reception apparatus and method will be applied to a MIMO communication system using the LTE standard, representing the latest version of 3rd Generation Partnership Project (3GPP)-family communication networks.

Embodiments of the present invention can all be applied to a precoding technique for allowing transport blocks to have the same equivalent channels, such as large-delay CDD of the LTE standard. In detailed descriptions of embodiments of the present invention, large-delay CDD of LTE will be considered.

Figure 3:
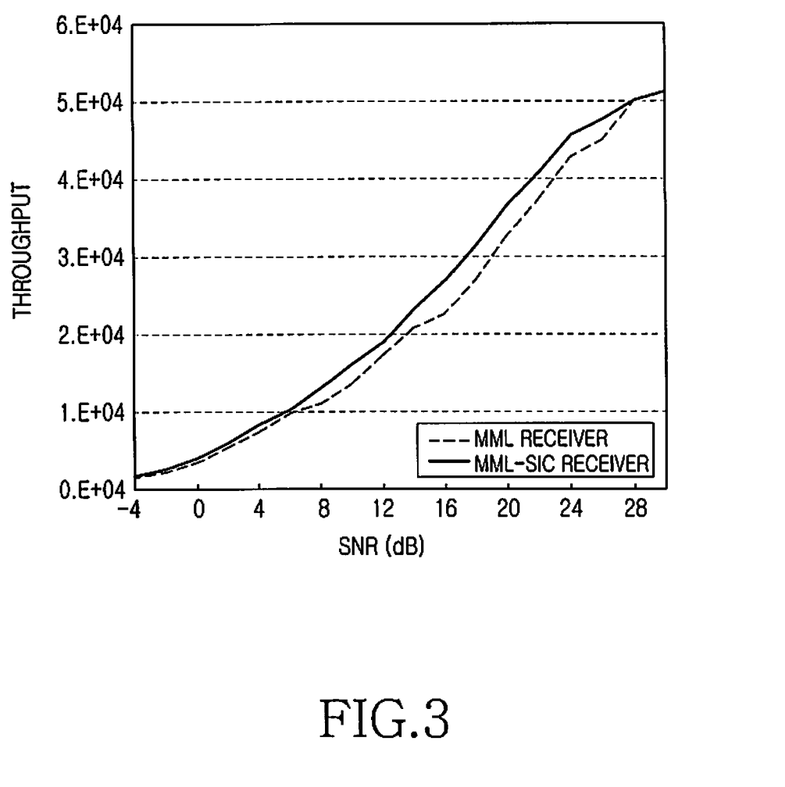
FIG. 3 is a comparison graph showing throughputs of a receiver using MML as a MIMO receive algorithm and a receiver using MML-SIC.

FIG. 3 is a comparison graph showing throughputs of a receiver using Modified Maximum Likelihood (MML) as a MIMO receive algorithm and a receiver using MML-SIC.

As shown in FIG. 3, it can be understood that the throughput increases with a Signal to Noise Ratio (SNR) and the MML-SIC receiver has a higher throughput than the MML receiver. In order for the MML-SIC receiver to obtain the improved throughput, a transmitter should allocate different MCS levels to transport blocks according to characteristics of the MML-SIC receiver.

Figure 4:
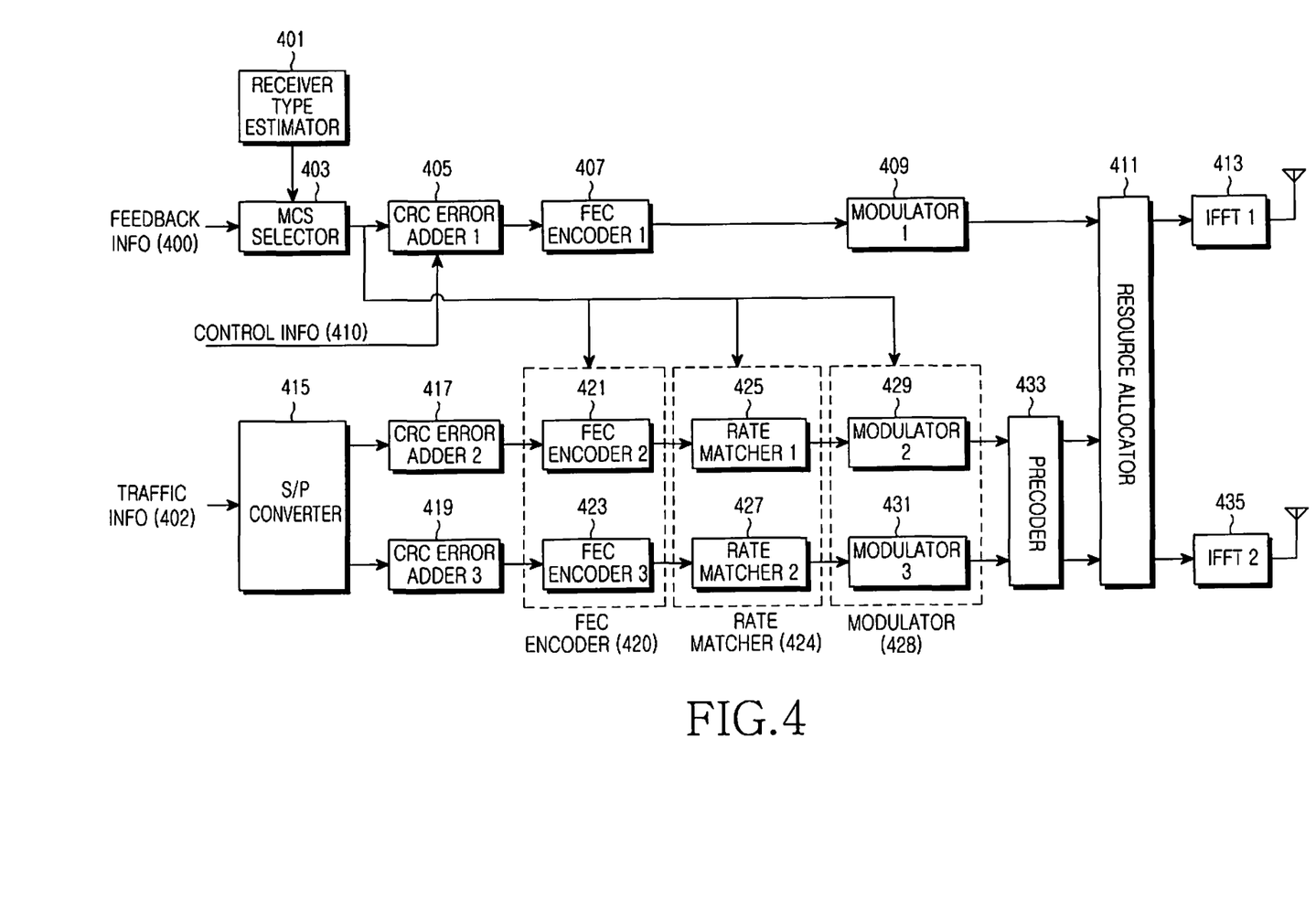
FIG. 4 is a diagram showing a structure of a first transmitter proposed for throughput improvement in a MIMO communication system.

FIG. 4 shows a structure of a first transmitter proposed for throughput improvement in a MIMO communication system.

Referring to FIG. 4, the first transmitter includes a receiver type estimator 401, an MCS selector 403, a first CRC error adder 405, a first FEC encoder 407, a first modulator 409, a resource allocator 411, a first IFFT unit 413, an S/P converter 415, a second CRC error adder 417, a third CRC error adder 419, a second FEC encoder 421, a third FEC encoder 423, a first rate matcher 425, a second rate matcher 427, a second modulator 429, a third modulator 431, a precoder 433, and a second IFFT unit 435. The S/P converter 415, the second CRC error adder 417, the third CRC error adder 419, an FEC encoding block 420, a rate matching block 424, and a modulation block 428 may be referred to as a "signal generator."

The first transmitter is similar to the transmitter of FIG. 1 in structure except for the receiver type estimator 401 and the MCS selector 403. Operating as shown in FIG. 5, the receiver type estimator 401 determines whether a receive algorithm of each receiver is based on SIC, and delivers the determination results to the MCS selector 403.

Figure 5:
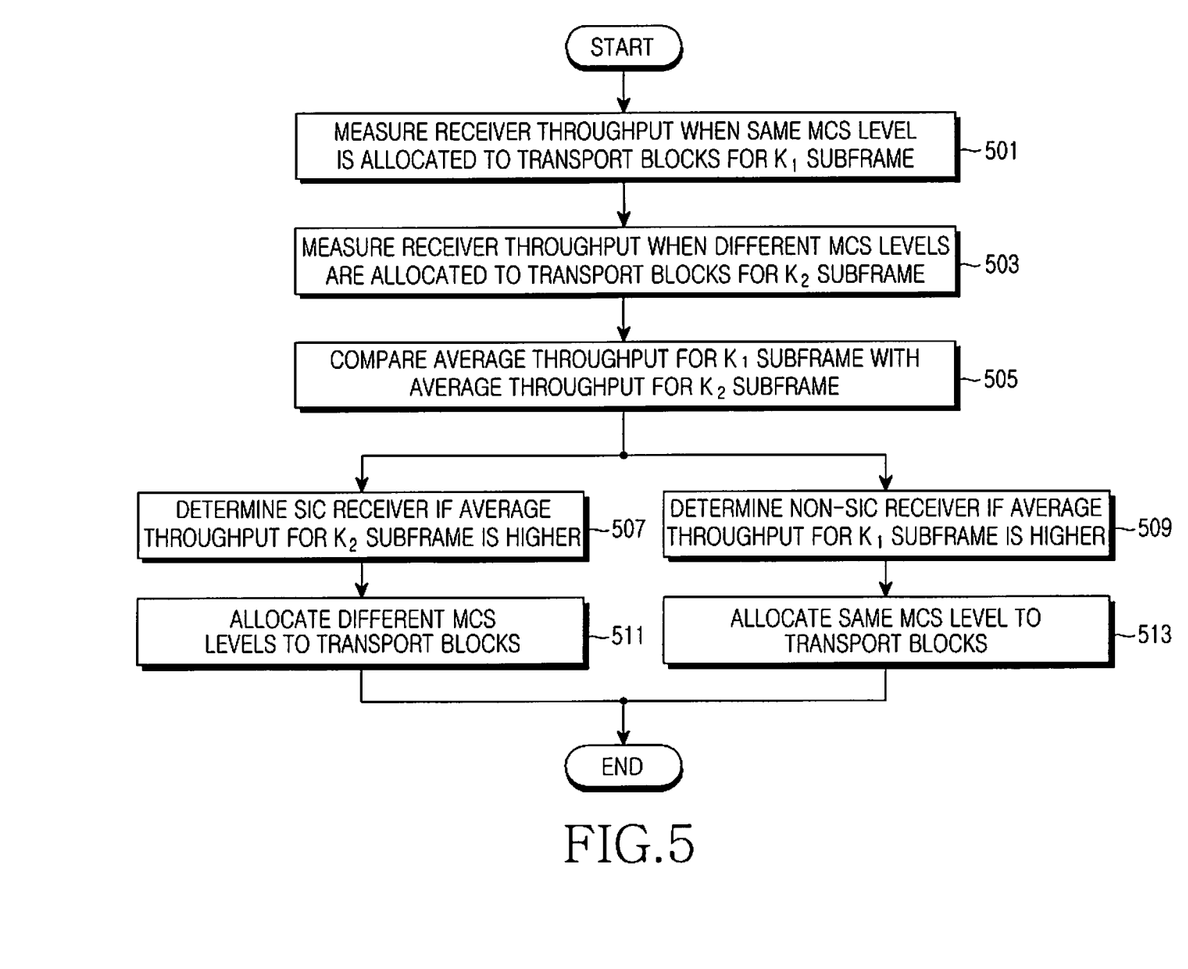
FIG. 5 is a flowchart showing operations of the receiver type estimator 401 and the MCS selector 403 in the first transmitter for throughput improvement in a MIMO communication system according to a first embodiment of the present invention.

FIG. 5 shows operations of the receiver type estimator 401 and the MCS selector 403 in the first transmitter for throughput improvement in a MIMO communication system, according to a first embodiment of the present invention.

Referring to FIG. 5, in step 501, the receiver type estimator 401 measures throughput of the receiver when the same MCS level is allocated to respective transport blocks during a $K_1$ subframe. In step 503, the receiver type estimator 401 measures throughput of the receiver when different MCS levels are allocated to respective transport blocks during a $K_2$ subframe. The transport blocks correspond to associated transport layers, and the $K_1$ and $K_2$ subframes refer to predetermined time periods.

To this end, the MCS selector 403 allocates the same MCS level to respective transport blocks, or respective transport layers, for the $K_1$ subframe, and allocates different MCS levels to respective transport blocks, or respective transport layers, for the $K_2$ subframe. To allocate different MCS levels to the transport blocks, the MCS selector 403 adjusts the MCS level by using, for example, an MCS offset table given for each user or each transport block, or ACK/NACK information received from the receiver. As another example, the MCS level may be adjusted using both the ACK/NACK information and the MCS offset table. The MCS offset table includes an offset value of another transport block against an MCS level value of one transport block.

In step 505, the receiver type estimator 401 compares an average throughput for the $K_1$ subframe with an average throughput for the $K_2$ subframe. If the average throughput for the $K_2$ subframe is higher, the receiver type estimator 401 determines in step 507 that the receiver is an SIC receiver. However, if the average throughput for the $K_1$ subframe is higher, the receiver type estimator 401 determines in step 509 that the receiver is a non-SIC receiver. Thus, through steps 501 to 509, the receiver type estimator 401 determines the type of the receiver, and outputs the results to the MCS selector 403.

Based on the receiver type information received from the receiver type estimator 401, if the receiver is an SIC receiver, the MCS selector 403 allocates different MCS levels to the transport blocks using an MCS offset table given to each user in step 511. On the other hand, if the receiver is a non-SIC receiver, the MCS selector 403 allocates the same MCS level to the transport blocks in step 513.

To represent an MCS level for, for example, two transport blocks, the same number, 2, of bits may be used. Generally, however, since a difference between MCS level values of two transport blocks is less than a range of all MCS level values, the number of bits of a control signal in use may be reduced by differentially encoding each MCS level index. The differential encoding should be performed such that even with the reduced number of bits, it is enough to represent the modulation order used during retransmission in the case where Hybrid Automatic Repeat reQuest (HARQ) is used.

So far, the first embodiment has been described, in which the receiver type estimator 401 determines the receiver type and delivers the results to the MCS selector 403. An operation of the MCS selector 403, which is performed based on the determined receiver type, is fixedly maintained for a predetermined time. Thereafter, the operation of FIG. 5 may be repeated.

In the first embodiment, the first transmitter allocates different MCS levels to transport blocks if the receiver type is an SIC receiver, and allocates the same MCS level to the transport blocks if the receiver type is a non-SIC receiver.

On the other hand, in a second embodiment, a description is made of a method for increasing a time period for which different MCS levels are allocated, if the receiver is an SIC receiver, and increasing a time period for which the same MCS level is allocated, if the receiver is a non-SIC receiver. That is, in the second embodiment, the receiver's throughput may be increased by adaptively adjusting a length of the period for which the same MCS level is allocated, and the period for which different MCS levels are allocated. In this case, the receiver type estimator 401 does not deliver the determined receiver type to the MCS selector 403, and the MCS selector 403 adaptively adjusts a length of each period and allocates an MCS level.

Figure 6:
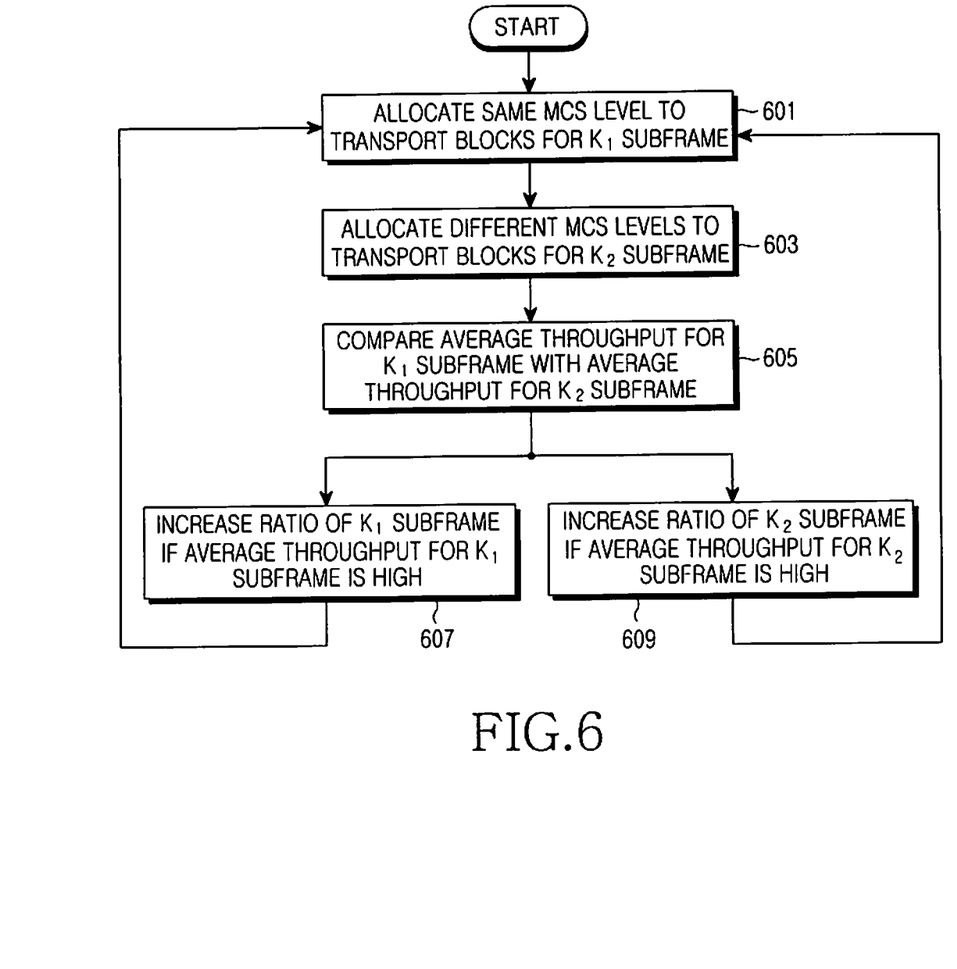
FIG. 6 is a flowchart showing an operation of the MCS selector 403 in the first transmitter for throughput improvement in a MIMO communication system according to a second embodiment of the present invention.

FIG. 6 shows an operation of the MCS selector 403 in the first transmitter for throughput improvement in a MIMO communication system according to a second embodiment of the present invention.

Referring to FIG. 6, the MCS selector 403 allocates the same MCS level to transport blocks for a $K_1$ subframe in step 601, and allocates different MCS levels to transport blocks for a $K_2$ subframe in step 603. The MCS selector 403 compares an average throughput of the receiver for the $K_1$ subframe with an average throughput of the receiver for the $K_2$ subframe in step 605. If the average throughput for the $K_1$ subframe is higher, the MCS selector 403 increases a ratio of the $K_1$ subframe by a predetermined value in step 607, and then returns to step 601. However, if the average throughput for the $K_2$ subframe is higher, the MCS selector 403 increases a ratio of the $K_2$ subframe by a predetermined value in step 609, and then returns to step 601. Although not shown, if the average throughput for the $K_1$ subframe is equal to the average throughput for the $K_2$ subframe, the MCS selector 403, depending on the system, may proceed to any one of steps 607 and 609, or may keep the current ratios of the subframes.

To summarize, as described in the first embodiment of FIG. 5, the MCS selector 403 allocates the same MCS level or different MCS levels to respective transport blocks using the receiver type that the receiver type estimator 401 determined based on average throughputs for the fixed $K_1$ and $K_2$ subframes. Otherwise, as described in the second embodiment of FIG. 6, the MCS selector 403 may allocate the same MCS level or different MCS levels to respective transport blocks while adjusting ratios of the $K_1$ and $K_2$ subframes.

In the first and second embodiments of the present invention based on the first transmitter of FIG. 4, the first transmitter determines the receiver type by itself That is, in the first embodiment, the first transmitter measures the receiver's throughput for a first time period in which the MCS levels are set to equal values, and the receiver's throughput for a second time period in which the MCS levels are set to different values, compares the measured throughputs, determines the receiver type according to the comparison results, and determines the same MCS level or different MCS levels according to the determined receiver type. In the second embodiment, the first transmitter increases a time period in which the same MCS level is applied, or a time period in which different MCS levels are applied.

Figure 7:
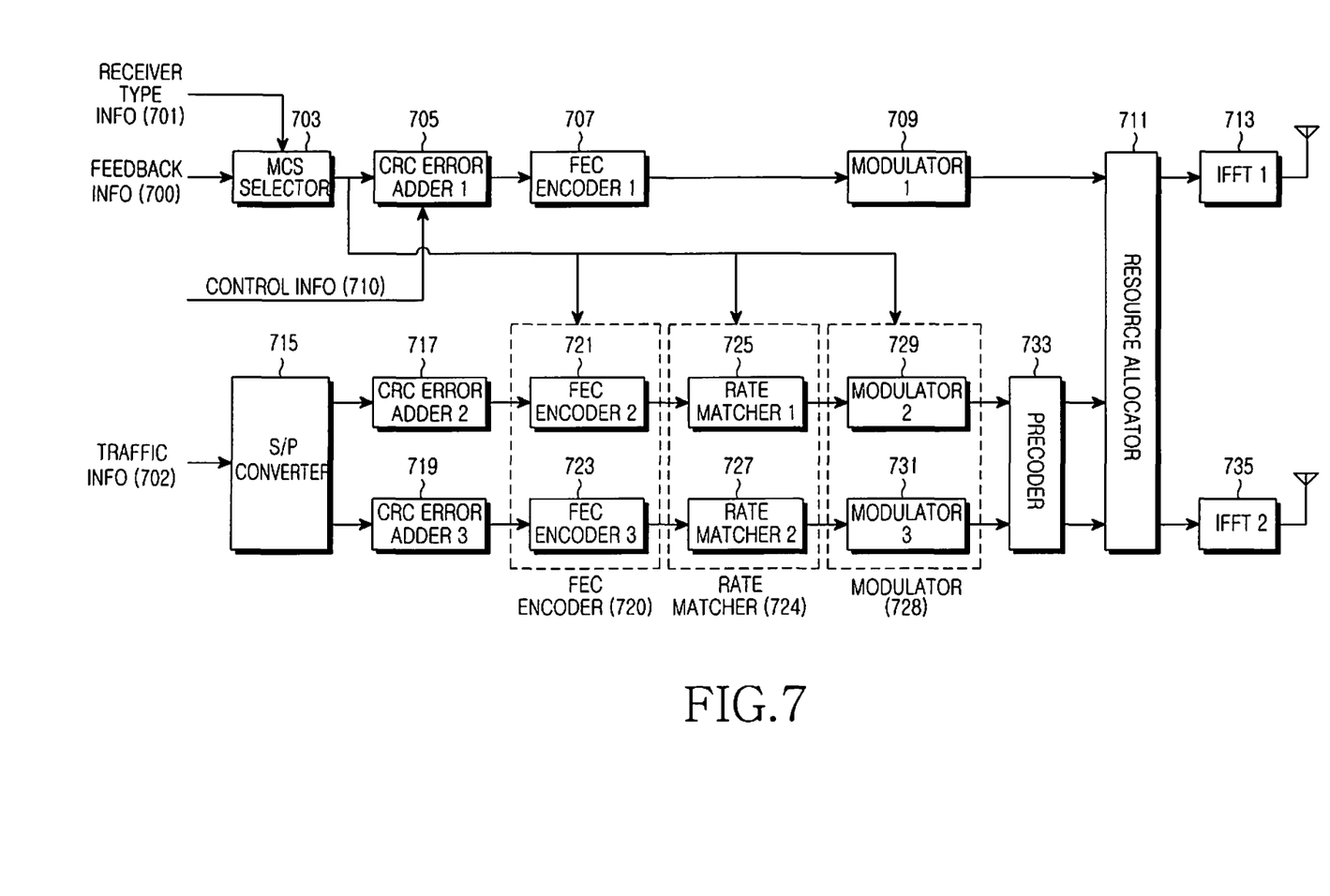
FIG. 7 is a diagram showing a structure of a second transmitter for throughput improvement in a MIMO communication system according to third and fourth embodiments of the present invention.

FIG. 7 shows a structure of a second transmitter for throughput improvement in a MIMO communication system according to third and fourth embodiments of the present invention. In the third and fourth embodiments, the transmitter identifies a receiver type by receiving information indicating the receiver type, from the receiver.

Referring to FIG. 7, the second transmitter includes an MCS selector 703, a first CRC error adder 705, a first FEC encoder 707, a first modulator 709, a resource allocator 711, a first IFFT unit 713, an S/P converter 715, a second CRC error adder 717, and a third CRC error adder 719, a second FEC encoder 721, a third FEC encoder 723, a first rate matcher 725, a second rate matcher 727, a second modulator 729, a third modulator 731, a precoder 733, and a second IFFT unit 735.

The second transmitter is largely the same as the transmitter of FIG. 1 in structure except that receiver type information 701 received from the receiver using a spare bit(s) of an upper-layer message is provided to the MCS selector 703. A method for delivering the receiver type information 701 through an upper-layer message may be carried out using spare bits between the transmitter and the receiver.

Figure 8:
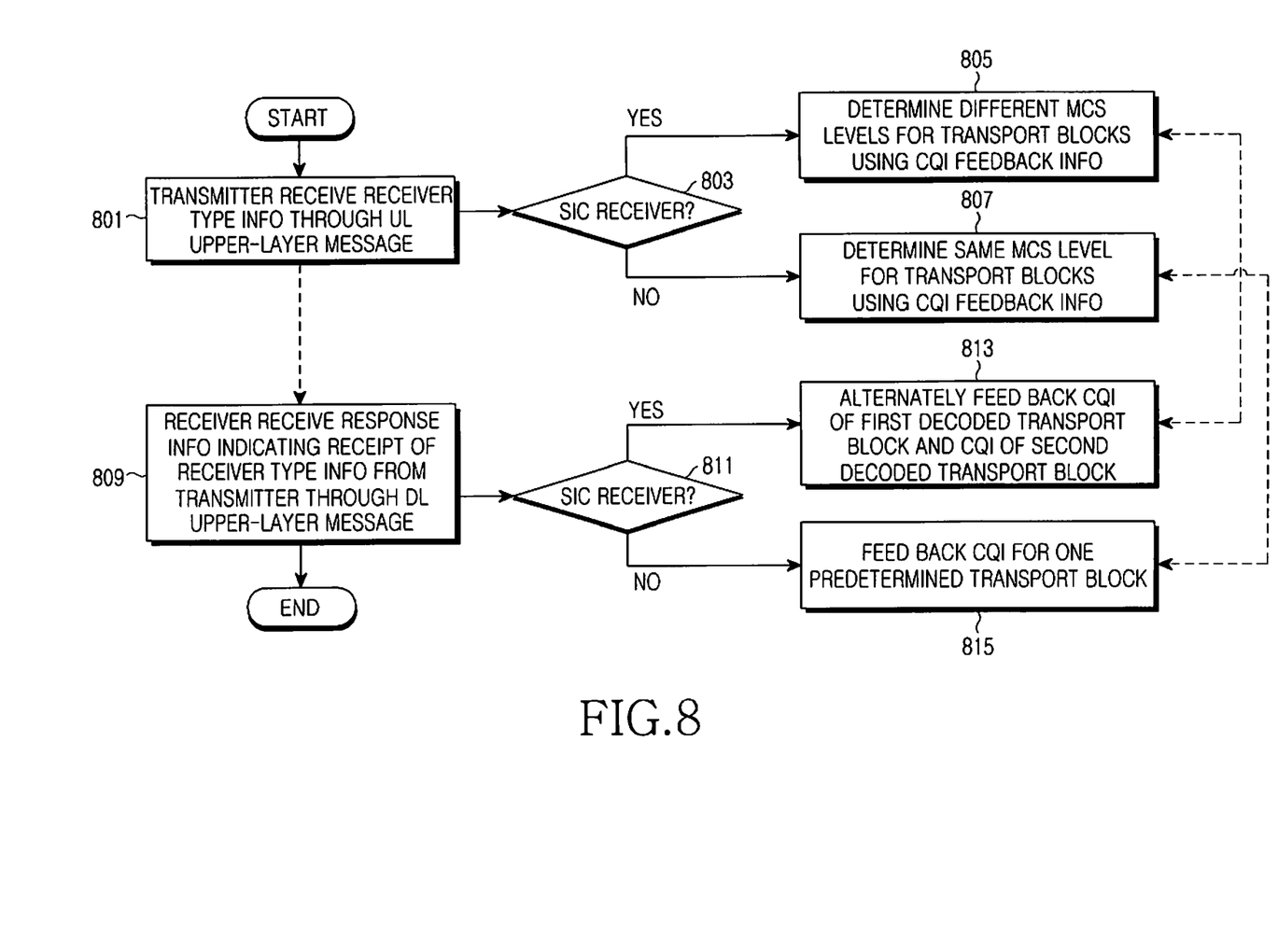
FIG. 8 is a flowchart showing an operation of the MCS selector 703 in the second transmitter and an operation of a receiver corresponding to the second transmitter in a MIMO communication system, according to the third embodiment of the present invention.

FIG. 8 shows an operation of the MCS selector 703 in the second transmitter and an operation of a receiver corresponding to the second transmitter in a MIMO communication system, according to the third embodiment of the present invention.

Referring to FIG. 8, the MCS selector 703 in the second transmitter receives, from a receiver, receiver type information 701 through an uplink (UL) upper-layer message in step 801, and then proceeds to step 803. Thereafter, the second transmitter transmits, to the receiver, response information indicating whether it has successfully received the receiver type information 701. The receiver corresponding to the second transmitter receives the response information transmitted by the second transmitter, through a downlink (DL) upper-layer message in step 809, and then proceeds to step 811.

In step 803, the MCS selector 703 determines whether the receiver is an SIC receiver, based on the received receiver type information 701.

If the receiver is an SIC receiver, the MCS selector 703 determines different MCS levels for respective transport blocks using CQI feedback information 700 in step 805. In this case, the MCS levels for the respective transport blocks may be determined using CQI feedback information, which is fed back from the receiver separately for each transport block.

On the other hand, if the receiver is a non-SIC receiver, the MCS selector 703 determines the same MCS level for the transport blocks using the CQI feedback information 700 in step 807. In this case, the MCS level for each transport block may be determined using CQI feedback information, which is fed back from the receiver, for one predetermined transport block.

If the receiver itself is an SIC receiver in step 811, the receiver alternately feeds back a CQI of a first decoded transport block and a CQI of a second decoded transport block to the second transmitter in step 813 so that the second transmitter may determine different MCS levels for the transport blocks.

On the other hand, if the receiver is a non-SIC receiver in step 811, the receiver feeds back CQI information for one predetermined transport block to the second transmitter in step 815 so that the second transmitter may determine the same MCS level for every transport block.

Figure 9:
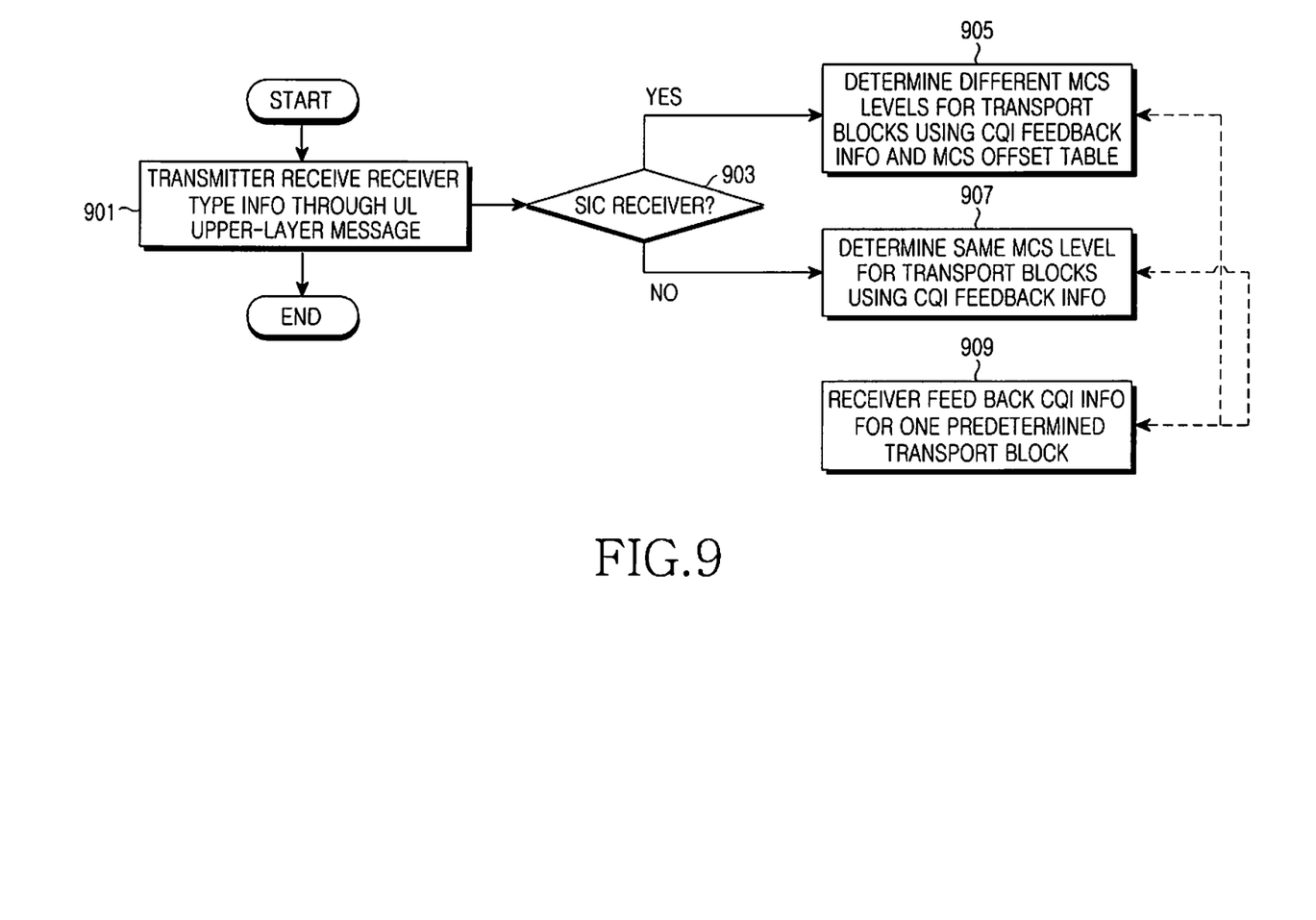
FIG. 9 is a flowchart showing an operation of the MCS selector 703 in the second transmitter and an operation of a receiver corresponding to the second transmitter in a MIMO communication system, according to the fourth embodiment of the present invention.

FIG. 9 shows an operation of the MCS selector 703 in the second transmitter and an operation of a receiver corresponding to the second transmitter in a MIMO communication system, according to the fourth embodiment of the present invention.

Referring to FIG. 9, the MCS selector 703 in the second transmitter receives receiver type information 701 through an uplink upper-layer message in step 901.

In step 903, the MCS selector 703 determines whether the receiver is an SIC receiver, based on the received receiver type information 701.

If the receiver is an SIC receiver, the MCS selector 703 determines different MCS levels for the transport blocks using at least one of the CQI feedback information 700 and an MCS offset table specific to each transport block in step 905.

Specifically, for an initial transport block, its MCS level is determined using only the CQI feedback information 700, and for a retransmission transport block, its MCS level is determined using both the CQI feedback information 700 and the MCS offset table.

On the other hand, if the receiver is a non-SIC receiver, the MCS selector 703 determines the same MCS level for the transport blocks using the CQI feedback information 700 in step 907.

Meanwhile, in step 909, the receiver corresponding to the second transmitter feeds back CQI information for one predetermined transport block no matter whether the receiver itself is an SIC receiver or not.

Figure 10:
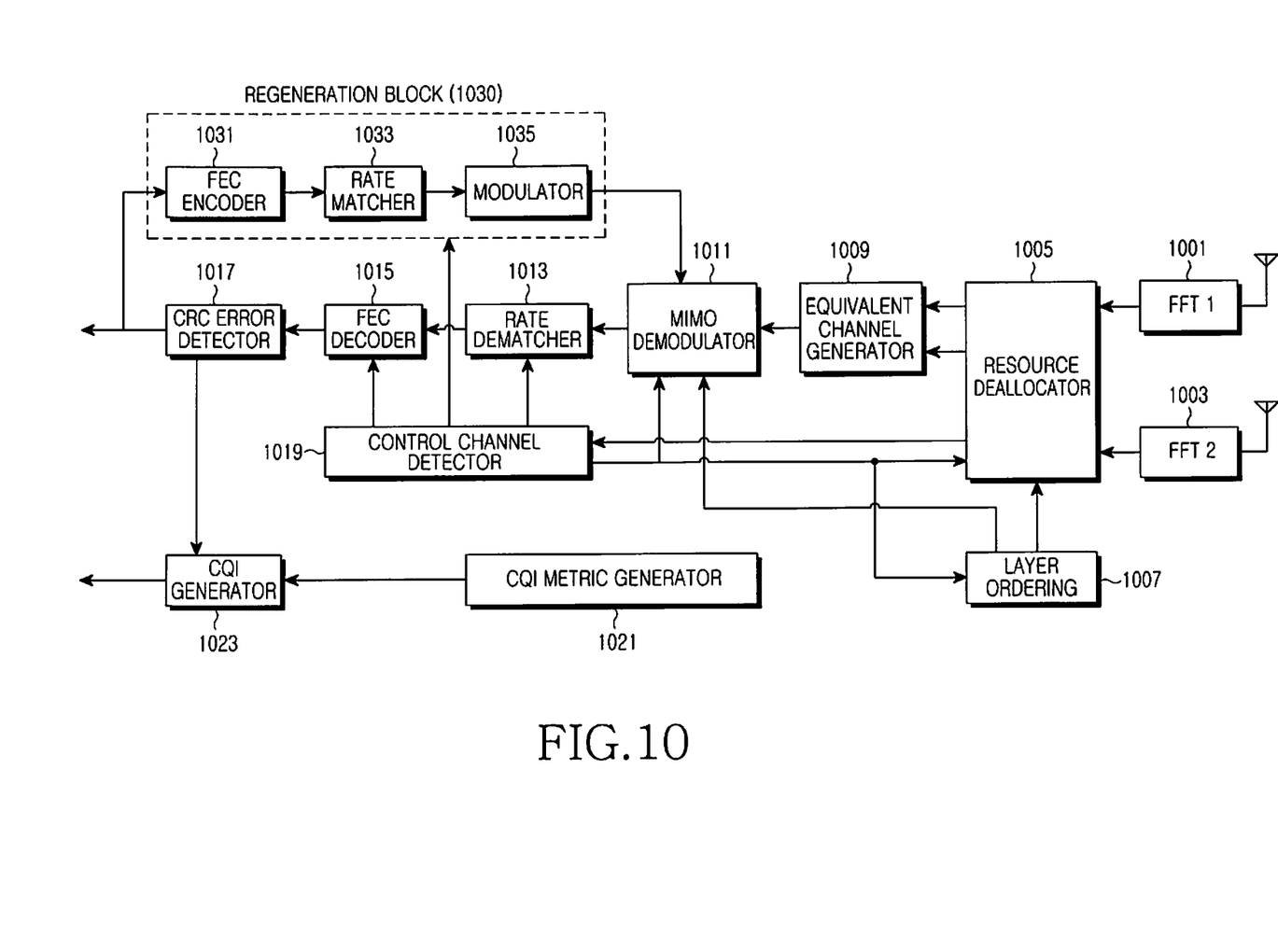
FIG. 10 is a diagram showing a structure of an SIC receiver for throughput improvement in a MIMO communication system, according to the third and fourth embodiments of the present invention.

FIG. 10 shows a structure of an SIC receiver for throughput improvement in a MIMO communication system, according to the third and fourth embodiments of the present invention.

Referring to FIG. 10, the SIC receiver includes a first FFT unit 1001, a second FFT unit 1003, a resource deallocator 1005, a layer ordering unit 1007, an equivalent channel generator 1009, a MIMO demodulator 1011, a rate dematcher 1013, an FEC decoder 1015, a CRC error detector 1017, a control channel detector 1019, a CQI metric generator 1021, a CQI generator 1023, an FEC encoder 1031, a rate matcher 1033, and a modulator 1035.

The SIC receiver is similar to the receiver of FIG. 2 in structure except a signal being input to the layer ordering unit 1007 and an operation of the layer ordering unit 1007. Although not shown, the SIC receiver includes a type information generator for generating type information indicating that its receiver type is an SIC receiver, and the type information is transmitted to a transmitter.

Rather than determining decoding order of transport blocks depending on the channel status, the layer ordering unit 1007 determines the decoding order using an MCS level specific to each user's transport block, received from the control channel detector 1019 so that transport blocks may be decoded in order of lower MCS level. That is, a transport block with the lowest MCS level is decoded first. If a transport block with a low MCS level among transport blocks having equivalent channels is decoded first, an error rate of the first decoded transport block decreases. Therefore, it is highly likely to remove a transmission signal associated with the first transport block from the received signal, resulting in an increase in gain of the SIC receiver.

Meanwhile, the decoding order is determined according to whether a transport block is an initial transport block or a retransmission transport block, as follows.

In a first case, if the transport blocks are all initial transport blocks, the transport blocks are decoded in order of the lowest MCS level. If a transport block with the lowest MCS level among transport blocks having equivalent channels is decoded first, an error rate of the first decoded transport block decreases. Hence, it is highly likely to remove a transmission signal associated with the first decoded transport block from the received signal, contributing to an increase in gain of the SIC receiver.

In a second case, if the transport blocks are all retransmission transport blocks, the retransmission transport blocks are decoded in order of their initial transport blocks having a low MCS level.

In a third case, if transport blocks include an initial transport block and a retransmission transport block, the retransmission transport block is decoded first compared with the initial transport block. If there are multiple initial transport blocks, the transport blocks are decoded in order of low MCS level as in the first case, and if there are multiple retransmission transport blocks, the retransmission transport blocks are decoded in order of their initial transport blocks having a low MCS level as in the second case.

Meanwhile, there is a limit on utilization of the SIC receiver if CQI feedback information is reported only for one transport block as in the prior art in a transceiver to which large-delay CDD is applied. If it is possible to report CQI feedback information for each of two transport blocks as described in FIG. 8, the CQI metric generator 1021 in FIG. 10 generates a CQI of the transport block to be decoded first in the same way as the existing method, but it should generate a CQI of the transport to be decoded second using Equations (3) and (4) below. Since the transport blocks have equivalent channel characteristics, Equations (3) and (4) have the same value.

$$|h_{e,11}|^2 + |h_{e,12}|^2 \quad (3)$$

$$|h_{e,21}|^2 + |h_{e,22}|^2 \quad (4)$$

If it is possible to feed back a CQI for each of transport blocks having equivalent channel characteristics such as Equations (3) and (4), the transmitter can determine MCS levels of the transport blocks using only the CQI feedback information without using the MCS offset table. Specifically, if the number of bits used to report the CQI feedback information is set the same as the prior art, CQI feedback information for transport blocks may be reported in an alternative way only when the receiver type is an SIC receiver.

As is apparent from the foregoing description, the present invention adjusts the transmission/reception apparatus so as to achieve optimal AMC according to the type of each receiver in a MIMO communication system, thereby improving the potential throughput of the SIC receiver.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for transmitting at least two transport blocks in a Multi-Input Multi-Output (MIMO) communication system, comprising:
   determining, by a transmitter, whether a type of a receiver receiving the at least two transport blocks is a Successive Interference Cancellation (SIC) receiver;
   determining a Modulation and Coding Scheme (MCS) level for the at least two transport blocks depending on whether the type of the receiver is the SIC receiver; and
   transmitting the at least two transport blocks using the determined MCS level.

2. The method of claim 1, wherein determining the type of the receiver comprises determining whether the receiver is the SIC receiver by measuring a throughput of the receiver.

3. The method of claim 1, wherein determining the type of receiver comprises:
   applying a same MCS level to the at least two transport blocks for a first time period, and measuring a first throughput of the receiver for the first time period;
   applying different MCS levels to the at least two transport blocks for a second time period, and measuring a second throughput of the receiver for the second time period;

determining the type of the receiver as the SIC receiver if the second throughput is greater than the first throughput; and determining the type of the receiver as a non-SIC receiver if the first throughput is greater than the second throughput.

4. The method of claim 1, wherein determining the MCS level comprises:

determining different MCS levels for the at least two transport blocks if the type of the receiver is the SIC receiver; and determining the same MCS level for the at least two transport blocks if the type of the receiver is a non-SIC receiver.

5. The method of claim 4, wherein determining different MCS levels comprises determining the different MCS levels by using at least one of a transport block-specific MCS offset table including an offset value of another transport block against an MCS level value of one transport block, and ACKnowledgement (ACK)/Negative ACKnowledgement (NACK) information received from the receiver.

6. The method of claim 3, wherein determining the MCS level comprises:

determining an MCS level by increasing a ratio of the second time period if the second throughput is greater than the first throughput; and determining an MCS level by increasing a ratio of the first time period if the first throughput is greater than the second throughput.

7. The method of claim 1, wherein determining the type of the receiver comprises:

receiving, from the receiver, type information indicating whether the receiver is the SIC receiver; and determining whether the receiver is the SIC receiver based on the received type information.

8. The method of claim 7, further comprising:

transmitting response information indicating the receipt of the type information, to the receiver using an upper-layer message; and receiving Channel Quality Information (CQI) from the receiver in response to the response information.

9. The method of claim 8, wherein receiving the CQI comprises:

individually receiving CQI for the at least two transport blocks if the type of the receiver is the SIC receiver; and receiving CQI for one predetermined transport block if the type of the receiver is a non-SIC receiver.

10. The method of claim 9, wherein determining the MCS level comprises:

determining different MCS levels for the at least two transport blocks according to the individually received CQI, if the type of the receiver is the SIC receiver; and determining the same MCS level for the at least two transport blocks according to the CQI for one predetermined transport block, if the type of the receiver is the non-SIC receiver.

11. The method of claim 8, wherein receiving the CQI comprises receiving CQI for one predetermined transport block.

12. The method of claim 11, wherein determining the MCS level comprises:

determining different MCS levels for the at least two transport blocks using at least one of CQI for one predetermined transport block and an MCS offset table for each transport block, if the type of the receiver is the SIC receiver; and determining a same MCS level for the at least two transport blocks according to the CQI for one predetermined transport block, if the type of the receiver is a non-SIC receiver.

13. An apparatus for transmitting at least two transport blocks in a Multi-Input Multi-Output (MIMO) communication system, comprising:

a first means for determining whether a type of a receiver receiving the at least two transport blocks is a Successive Interference Cancellation (SIC) receiver;

a Modulation and Coding Scheme (MCS) selector for determining a MCS level for the at least two transport blocks depending on whether the type of the receiver is the SIC receiver; and a signal generator for transmitting the at least two transport blocks using the determined MCS level.

14. The apparatus of claim 13, wherein the first means determines whether the type of the receiver is the SIC receiver by measuring a throughput of the receiver.

15. The apparatus of claim 13, wherein the first means is a receiver type estimator comprising:

applying a same MCS level to the at least two transport blocks for a first time period, and measuring a first throughput of the receiver for the first time period;

applying different MCS levels to the at least two transport blocks for a second time period, and measuring a second throughput of the receiver for the second time period;

determining the type of the receiver as the SIC receiver if the second throughput is greater than the first throughput; and determining the type of the receiver as a non-SIC receiver if the first throughput is greater than the second throughput.

16. The apparatus of claim 13, wherein the MCS selector determines different MCS levels for the at least two transport blocks if the type of the receiver is the SIC receiver, and determines the same MCS level for the at least two transport blocks if the type of the receiver is a non-SIC receiver.

17. The apparatus of claim 16, wherein the MCS selector determines different MCS levels using at least one of a transport block-specific MCS offset table including an offset value of another transport block against an MCS level value of one transport block, and ACKnowledgement (ACK)/Negative ACKnowledgement (NACK) information received from the receiver.

18. The apparatus of claim 15, wherein the MCS selector determines an MCS level by increasing a ratio of the second time period if the second throughput is greater than the first throughput, and determines an MCS level by increasing a ratio of the first time period if the first throughput is greater than the second throughput.

19. The apparatus of claim 13, wherein the first means is an MCS selector for receiving, from the receiver, type information indicating whether the receiver is the SIC receiver, and determines whether the receiver is the SIC receiver based on the received type information.

20. The apparatus of claim 19, wherein the MCS selector transmits response information indicating the receipt of the type information, to the receiver using an upper-layer message, and receives Channel Quality Information (CQI) from the receiver in response to the response information.

21. The apparatus of claim 20, wherein the MCS selector individually receives CQI for the at least two transport blocks if the type of the receiver is the SIC receiver, and receives CQI for one predetermined transport block if the type of the receiver is a non-SIC receiver.

22. The apparatus of claim 21, wherein the MCS selector determines different MCS levels for the at least two transport blocks according to the individually received CQI, if the type of the receiver is the SIC receiver, and determines the I same MCS level for the at least two transport blocks according to the CQI for one predetermined transport block, if the type of the receiver is the non-SIC receiver.

23. The apparatus of claim 20, wherein the MCS selector receives CQI for one predetermined transport block.

24. The apparatus of claim 23, wherein the MCS selector determines different MCS levels for the at least two transport blocks using at least one of CQI for one predetermined transport block and an MCS offset table for each transport block, if the type of the receiver is the SIC receiver, and determines a same MCS level for the at least two transport blocks according to the CQI for one predetermined transport block, if the type of the receiver is a non-SIC receiver.

25. A method for receiving at least two transport blocks from a transmitter by a receiver in a Multi-Input Multi-Output (MIMO) communication system, comprising:
    transmitting, to the transmitter, type information indicating whether the receiver is a Successive Interference Cancellation (SIC) receiver;
    receiving response information indicating receipt of the type information, from the transmitter using an upper-layer message;
    transmitting Channel Quality Information (CQI) to the transmitter in reply to the response information; and
    receiving the at least two transport blocks to which a Modulation and Coding Scheme (MCS) determined using the CQI is applied.

26. The method of claim 25, wherein transmitting the CQI comprises:
    individually transmitting CQI for the at least two transport blocks in decoded order of the at least two transport blocks if a type of the receiver is the SIC receiver;
    transmitting CQI for one predetermined transport block if the type of the receiver is a non-SIC receiver.

27. The method of claim 25, wherein receiving the at least two transport blocks comprises decoding the at least two transport blocks in order of a low MCS level.

28. The method of claim 25, where receiving the at least two transport blocks comprises:
    decoding an initially transmitted transport block first if at least one of the at least two transport blocks is a retransmitted transport block; and
    decoding retransmitted transport blocks in order of a low MCS level of their associated initial transport blocks, if the at least two transport blocks are both the retransmitted transport blocks.

29. A receiver for receiving at least two transport blocks from a transmitter in a Multi-Input Multi-Output (MIMO) communication system, comprising:
    a type generator for generating type information indicating whether the receiver is a Successive Interference Cancellation (SIC) receiver, and transmitting the type information to the transmitter;
    a Channel Quality Information (CQI) generator for receiving response information indicating receipt of the type information from the transmitter using an upper-layer message, generating CQI in reply to the response information, and transmitting the CQI to the transmitter; and
    a signal receiver for receiving the at least two transport blocks to which a Modulation and Coding Scheme (MCS) determined using the CQI is applied.

30. The receiver of claim 29, wherein the CQI generator individually transmits CQI for the at least two transport blocks if the type of the receiver is the SIC receiver, and transmits CQI for one predetermined transport block if the type of the receiver is a non-SIC receiver.

31. The receiver of claim 29, wherein the signal receiver comprises a layer ordering unit for determining a decoding order to decode the at least two transport blocks in order of a low MCS level.

32. The receiver of claim 29, wherein the signal receiver comprises a layer ordering unit for determining a decoding order to decode an initially transmitted transport block first if at least one of the at least two transport blocks is a retransmitted transport block, and to decode retransmitted transport blocks in order of a low MCS level of their associated initial transport blocks, if the at least two transport blocks are both the retransmitted transport blocks.

* * * * *